(12) United States Patent
Minerbo et al.

(10) Patent No.: US 8,558,548 B2
(45) Date of Patent: Oct. 15, 2013

(54) DETERMINING ANISOTROPIC RESISTIVITY

(75) Inventors: Gerald Minerbo, Missouri City, TX (US); Andrei Davydychev, Sugar Land, TX (US); Keli Sun, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 411 days.

(21) Appl. No.: 12/844,929

(22) Filed: Jul. 28, 2010

(65) Prior Publication Data
US 2012/0025834 A1 Feb. 2, 2012

(51) Int. Cl.
*G01V 3/10* (2006.01)
(52) U.S. Cl.
USPC .............................. 324/339; 324/338; 324/343
(58) Field of Classification Search
USPC .............................. 367/1–86; 166/244.1–403, 166/250.01–250.17; 73/152.01–152.62; 702/1–199; 324/323–375; 343/703, 343/709, 718–719; 175/1, 40–50; 250/253–266
See application file for complete search history.

(56) References Cited

U.S. PATENT DOCUMENTS

| | | | |
|---|---|---|---|
| 7,202,670 B2 | 4/2007 | Omeragic et al. | |
| 7,382,135 B2 | 6/2008 | Li et al. | |
| 2009/0302851 A1* | 12/2009 | Bittar et al. | 324/338 |
| 2012/0068712 A1* | 3/2012 | Taherian et al. | 324/338 |

FOREIGN PATENT DOCUMENTS

| | | |
|---|---|---|
| GB | 2407641 A | 5/2005 |
| WO | 02073236 A2 | 9/2002 |
| WO | 2008076130 A1 | 6/2008 |
| WO | 2010039357 A2 | 4/2010 |

OTHER PUBLICATIONS

EP Extended Search Report dated Nov. 18, 2011 for corresponding EP Application No. 11171311.1 filed Jun. 24, 2011.
J.R. Tabanou, J.-M. Denichou, J. Horkowitz, D. Omeragic, J. Rasmus, J. Yan, "Going beyond "Geometrical drilling": A Review of the contribution of LWD measurements to the improvement of Well placement", 1st SPWLA India Regional Symposium: Formation Evaluation in Horizontal Wells, Mumbai, India, Mar. 19-20, 2007.
D. Omeragic, A. Dumont, C. Esmersoy, T. Habashy, Q. Li, G. Minerbo, R. Rosthal, J. Smits, and J.R. Tabanou, "Sensitivities of Directional Electromagnetic Measurements for Well Placement and Formation Evaluation While Drilling," paper presented at 76th SEG Annual Meeting, New Orleans, LA, Oct. 1-5, 2006.

(Continued)

*Primary Examiner* — Arleen M Vazquez
*Assistant Examiner* — Alesa Allgood
(74) *Attorney, Agent, or Firm* — Kenneth Liu; Jeremy Berman

(57) ABSTRACT

The present disclosure relates to a method to determine the vertical resistivity of a subsurface formation. A downhole logging tool having a plurality of spaced antennas, at least one of which is a transverse antenna, at least two of which are tilted antennas, and at least two of which are axial antennas is provided. Measurements involving the transverse and/or the tilted antennas of the downhole logging tool are obtained. Voltage ratios are formed using the measurements, and conditioning factors are formed by raising the determined voltage ratios not involving the transverse antenna to some arbitrary power. The sum of the exponents of the conditioning factors preferably equals one. A voltage ratio involving the transverse antenna is multiplied by the conditioning factors, and the vertical resistivity of the subsurface formation is determined using the resulting ratio.

20 Claims, 5 Drawing Sheets

(56) References Cited

OTHER PUBLICATIONS

D. Omeragic, T. Habashy, C. Esmersoy, Q. Li, J. Seydoux, J. Smits, and J.R. Tabanou, "Real-Time Interpretation of Formation Structure From Directional EM Measurements," paper presented at the 47th SPWLA Annual Symposium, Veracruz, Mexico, Jun. 4-7, 2006.

D. Omeragic, Q. Li, L. Chou, L. Yang, K. Duong, J. Smits, T. Lau, C.B. Liu, R. Dworak, V. Dreuillault, J. Yang, and H. Ye, "Deep Directional Electromagnetic Measurements for Optimal Well Placement", paper 97045 presented at the 2005 SPE Annual Technical Conference and Exhibition, Dallas, TX, Oct. 9-12, 2005.

Li, Q., D. Omeragic, L. Chou, L. Yang, K. Duong, J. Smits, T. Lau, C.B. Liu, R. Dworak, V. Dreuillault, J. Yang, and H. Ye, et al.: "New directional electromagnetic tool for proactive geosteering and accurate formation evaluation while drilling," paper presented at the 46th SPWLA Annual Symposium, New Orleans, LA, Jun. 26-29, 2005.

Yang, J., Omeragic, D., Liu, C. B., Li, Q., and Smits, J., "Bed-Boundary Effect Removal to Aid Formation Resistivity Interpretation from LWD Propagation Measurements at All Dip Angles," paper presented at the 2005 46th SPWLA Armual Symposium, New Orleans, LA, Jun. 26-29, 2005.

J. H. Moran and S. Gianzero, Effects of formation anisotropy on resistivity-logging measurements, Geophysics, vol. 44, Issue 7, 1266-1286 (1979).

A .I. Davydychev, G. N. Minerbo, and D. Omeragic, Periscope 15 borehole/eccentricity effects in homogeneous isotropic formation, SPC Engineering Report, GEMS 100714157, version 1: Jun. 30, 2009, version 2: Sep. 3, 2009.

\* cited by examiner

DETERMINING ANISOTROPIC RESISTIVITY

CROSS-REFERENCE TO OTHER APPLICATIONS

N/A

BACKGROUND

1. Technical Field

The present disclosure relates generally to the logging of subsurface formations surrounding a wellbore using a downhole logging tool, and particularly to using the logs to estimate the anisotropic resistivity.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions (e.g., T1 and T2). MWD and LWD tools often have components common to wireline tools (e.g., transmitting and receiving antennas), but MWD and LWD tools must be constructed to not only endure but to operate in the harsh environment of drilling.

Certain existing resistivity logging tools have at least one transverse antenna. That is, the magnetic dipole moment of the transverse antenna is perpendicular to the longitudinal axis of the tool. For example, one model of the Schlumberger Technology Corporation's PERISCOPE™ logging tools measures the propagation of electromagnetic signals with an array of transmitter and receiver coils that includes two tilted receivers and one transverse transmitter. The tool obtains directional information, and also detects anisotropic resistivity.

SUMMARY

The present disclosure relates to a method to determine the vertical resistivity of a subsurface formation. A downhole logging tool is provided having a plurality of spaced antennas, at least one of which is a transverse antenna, at least two of which are tilted antennas, and at least two of which are axial antennas. Measurements of the transverse-to-tilted, and tilted-to-axial couplings are obtained. When the relative dip angle is small, only measurements of transverse-to-tilted couplings are sensitive to resistivity anisotropy. They may be combined with measurements of tilted-to-axial couplings, to achieve several objectives: (1) improve relative sensitivity to anisotropy; (2) improve vertical response; and (3) avoid the need to calibrate the antennas individually.

Other aspects and advantages will become apparent from the following description and the attached claims.

DETAILED DESCRIPTION

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
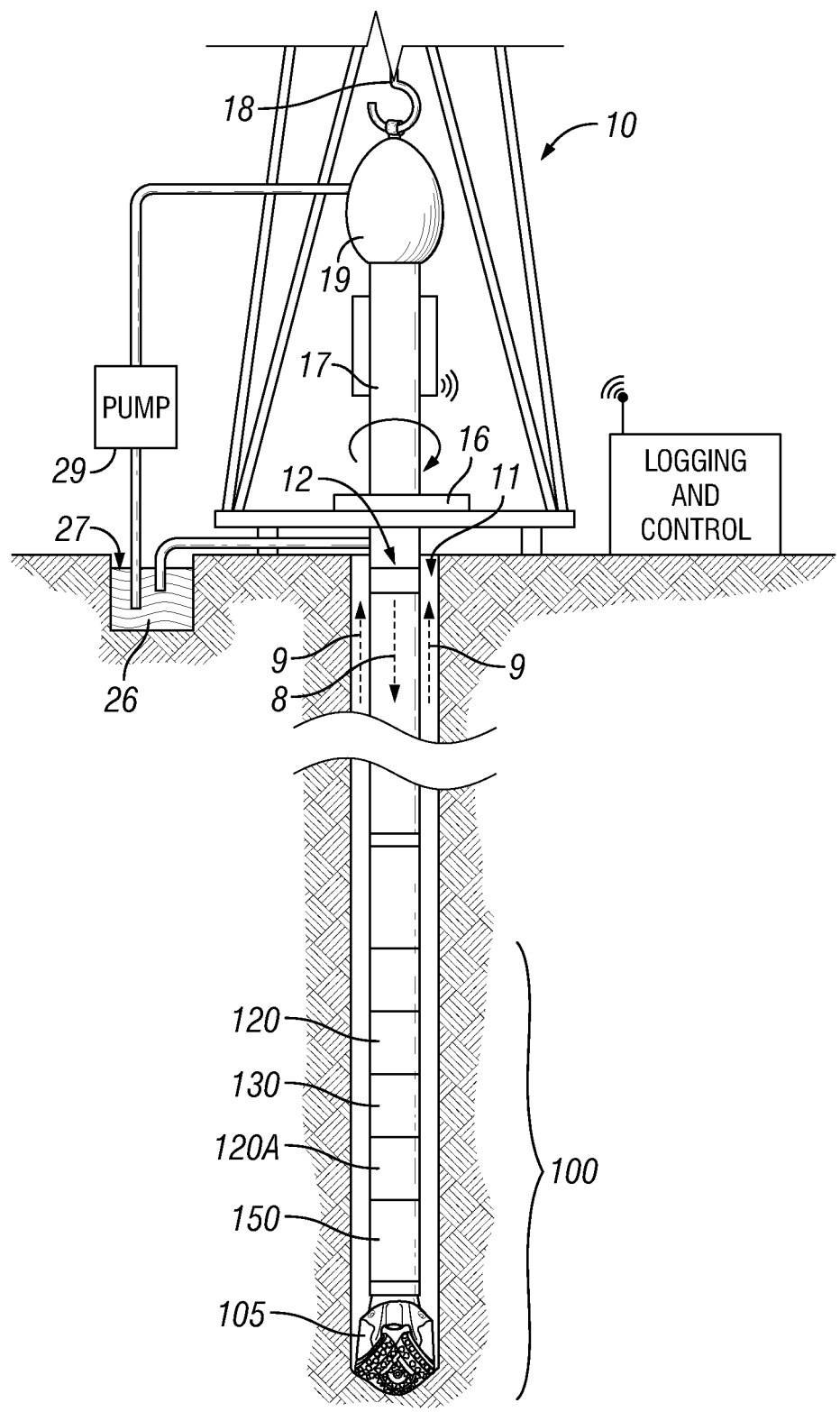
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
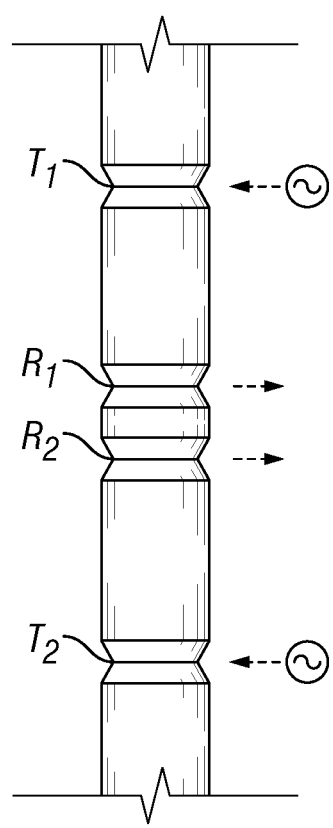
FIG. 2 shows a prior art electromagnetic logging tool.

An example of a tool which can be the LWD tool 120, or can be a part of an LWD tool suite 120A, is shown in FIG. 2.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Figure 3:
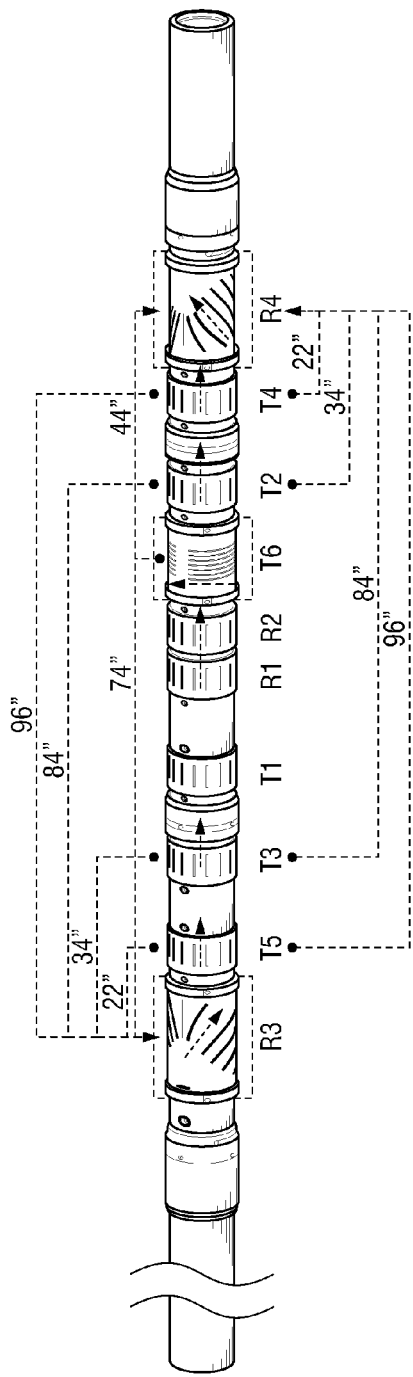
FIG. 3 is a schematic drawing of a particular resistivity logging tool that may be used in accordance with the present disclosure.

Resistivity logging tools having certain combinations of tilted and transverse antennas can be used to obtain better logs of the vertical resistivity, $R_v$, in anisotropic formations. In particular, data involving the transverse antenna can be combined into a computed quantity that provides an improved estimate of $R_v$. For ease of discussion, a particular resistivity logging tool is shown in FIG. 3. The nomenclature for the transmitters (T) and the receivers (R) is shown in FIG. 3. The nominal axial positions of the coils are listed in Table 1. FIG. 3 also shows the relative spacings for various transmitter/receiver pairs.

TABLE 1

| Coil | Axial position (inches) |
|---|---|
| R3 | −62 |
| T5 | −40 |
| T3 | −28 |
| T1 | −16 |
| R1 | −3 |
| R2 | 3 |
| T6 | 12 |
| T2 | 22 |
| T4 | 34 |
| R4 | 56 |

The following ratio is known to be sensitive to the anisotropy $R_v/R_h$:

$$\mathcal{R}_{A59o} = \frac{\langle T6R3 \rangle}{\langle T6R4 \rangle}. \quad \text{Eq. 0}$$

In the subscript "$A_{59o}$", "A" stands for the anisotropy measurement, and "59" (inches) corresponds to the average of the T6R3 (74 inches) and T6R4 (44 inches) spacings, as in the example given in Table 1. It should be understood that for another layout of transmitters and receivers this average spacing may be different, and that the discussion below is general and by no means restricted to or by the specific average spacing of 59 inches being considered in this example. The angle brackets indicate averages over the tool rotation angle. The ratio $\mathcal{R}$ involves the complex (phasor) voltage recorded at two different receivers produced by the same transmitter current, each voltage averaged over the rotation of the tool. The term "voltage ratio" will be used herein for this type of signal combination. Note that the ratio $\mathcal{R}$ is sensitive to calibrations (shifts in the attenuation and the phase) of both tilted receivers R3 and R4, and it would be desirable to compensate for this dependence.

At present, one manner in which the information from transmitter T6 in the representative tool is processed is as the ratio:

$$\mathcal{R}_{A59a} = \frac{\langle T6R3 \rangle \langle T2R4 \rangle}{\langle T6R4 \rangle \langle T2R3 \rangle}. \quad \text{Eq. 1}$$

This ratio can be thought of as comprising two voltage ratios, one voltage ratio involving the transverse antenna and one voltage ratio not involving the transverse antenna. For small dip angles (i.e., near-vertical wells), the ratio $R_{A59a}$ is relatively insensitive to the vertical conductivity, $\sigma_v$, particularly in resistive formations.

An alternative ratio that could be used is:

$$\mathcal{R}_{A59b} = \frac{\langle T6R3 \rangle \langle T3R4 \rangle}{\langle T6R4 \rangle \langle T3R3 \rangle}. \quad \text{Eq. 2}$$

To enhance the sensitivity to $\sigma_v$, we consider a generalization of the form:

$$\mathcal{R}_{A59c} = \frac{\langle T6R3 \rangle}{\langle T6R4 \rangle} \left( \frac{\langle T2R4 \rangle}{\langle T2R3 \rangle} \right)^{\frac{1}{2}} \left( \frac{\langle T3R4 \rangle}{\langle T3R3 \rangle} \right)^{\frac{1}{2}}. \quad \text{Eq. 3}$$

Unlike $\mathcal{R}$, the ratios $\mathcal{R}$, $\mathcal{R}$, and $\mathcal{R}$ in Eqs. 1, 2, and 3 do not require coil calibration. If there is a change in the magnetic moment of one of the coils, or if its phase is shifted, the ratio $\mathcal{R}$, for example, remains unchanged. Also, the ratio $\mathcal{R}$ is not affected by a change in the current in one of the transmitters or the gain in one of the receiver amplifiers. Similarly, the ratios $\mathcal{R}$ and $\mathcal{R}$ are not affected by these changes. The attenuation decrement (dB) and phase shift (degrees) that correspond to each ratio is obtained from:

$$atten = 20\log_{10}(abs(\mathcal{R})), \quad phase = -\frac{180}{\pi}angle(\mathcal{R}). \qquad \text{Eq. 4}$$

In Eq. 4, $\mathcal{R}$ denotes one of the ratios defined above ($\mathcal{R}$, $\mathcal{R}$, or $\mathcal{R}$). As in all LWD resistivity measurements, an appropriate air calibration correction is needed before inversion.

In FIG. 3, it is seen that T2R4 and T3R3 have the same spacing (34 inches). Also T2R3 and T3R4 have the same spacing (84 inches). Therefore, in a homogeneous medium we have, theoretically, $$\frac{\langle T2R4\rangle}{\langle T2R3\rangle}\frac{\langle T3R4\rangle}{\langle T3R3\rangle} = 1. \qquad \text{Eq. 5}$$

This relation is also valid in any medium with no z variation, where z denotes position along the tool axis. Further, it is also valid if the medium is symmetric about the plane z=−3 inches.

As an alternative to Eq. 3, the following ratio could be used:

$$\mathcal{R}_{A59d} = \frac{\langle T6R3\rangle}{\langle T6R4\rangle}\left(\frac{\langle T4R4\rangle}{\langle T4R3\rangle}\right)^{\frac{1}{2}}\left(\frac{\langle T5R4\rangle}{\langle T5R3\rangle}\right)^{\frac{1}{2}}. \qquad \text{Eq. 6}$$

T4R4 and T5R3 have the same spacing (22 inches), as seen in FIG. 3. Also T4R3 and T5R4 have the same spacing (96 inches). Theoretically, in a homogeneous medium, we expect that:

$$\frac{\langle T4R4\rangle}{\langle T4R3\rangle}\frac{\langle T5R4\rangle}{\langle T5R3\rangle} = 1. \qquad \text{Eq. 7}$$

A more general ratio that does not require coil calibration is:

$$\mathcal{R}_{A59e} = \frac{\langle T6R3\rangle}{\langle T6R4\rangle}\left(\frac{\langle T1R4\rangle}{\langle T1R3\rangle}\right)^{\alpha}\left(\frac{\langle T2R4\rangle}{\langle T2R3\rangle}\right)^{\beta} \qquad \text{Eq. 8}$$
$$\left(\frac{\langle T3R4\rangle}{\langle T3R3\rangle}\right)^{\gamma}\left(\frac{\langle T4R4\rangle}{\langle T4R3\rangle}\right)^{\delta}\left(\frac{\langle T5R4\rangle}{\langle T5R3\rangle}\right)^{1-\alpha-\beta-\gamma-\delta},$$

where $\alpha$, $\beta$, $\gamma$, and $\delta$ are arbitrary real numbers. The voltage ratios that are expressly raised to some power (i.e., those not involving a transverse antenna) are referred to herein as "conditioning factors". $\mathcal{R}$ reduces to $\mathcal{R}$ when $\alpha=\delta=0$ and $\beta=\gamma=\frac{1}{2}$. Use of the ratio $\mathcal{R}$ is generally preferable.

Figure 4:
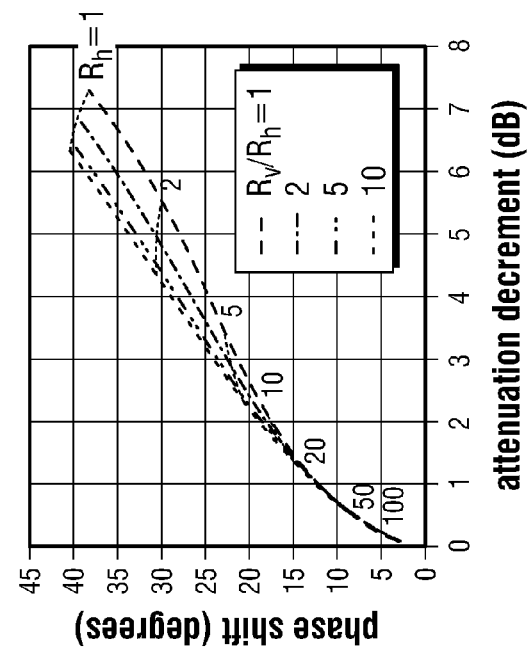
FIG. 4 is a plot showing the behavior of the ratio $\mathcal{R}$ at 400 kHz in a homogeneous medium at zero dip, assuming point dipole coils, in accordance with the present disclosure.
Figure 5:
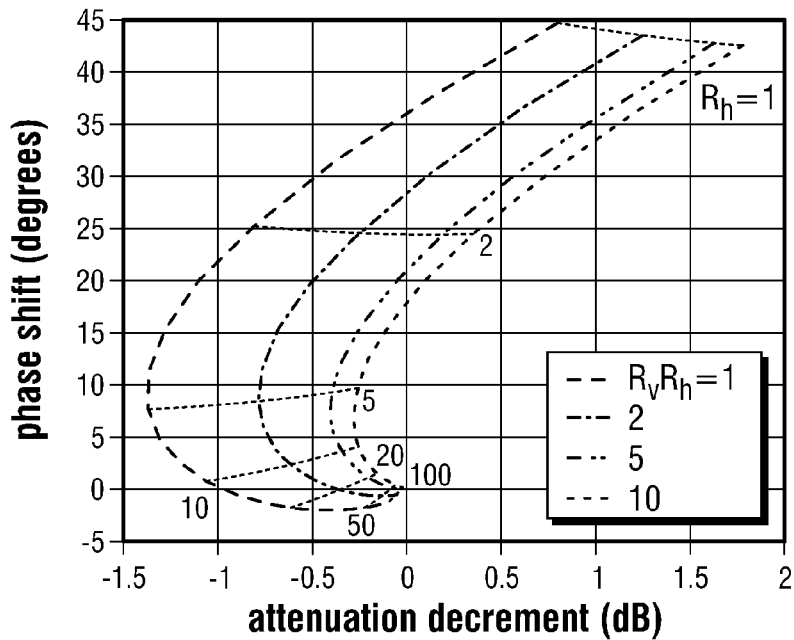
FIG. 5 is a plot showing the behavior of the ratio $1/\mathcal{R}$ at 400 kHz in a homogeneous medium at zero dip, assuming point dipole coils, in accordance with the present disclosure.

The behavior of $\mathcal{R}$ in a homogeneous medium is plotted in FIG. 4. The dip angle is zero and the frequency is 400 kHz. The response was computed from the Moran-Gianzero formulas that assume point-dipole coils. [J. H. Moran and S. Gianzero, Effects of formation anisotropy on resistivity-logging measurements, *Geophysics* 44, 1266-1286 (1979)]. The corresponding information for $\mathcal{R}$ is plotted in FIG. 5. For convenience, FIG. 5 gives the attenuation and phase of the reciprocal ratio $1/\mathcal{R}$. In a homogeneous medium, at low conductivity, the leading term in $\mathcal{R}$ is proportional to $\sigma_v$, whereas $\mathcal{R}$ gets a strong contribution from $\sigma_h$ that masks the more subtle $\sigma_v$ dependence.

If $\sigma_v$ varies while $\sigma_h$ is held fixed, the absolute change in atten and phase is the same in FIGS. 4 and 5. At zero dip angle, terms like $\langle T2R3\rangle$ are independent of $\sigma_v$ because the coupling between axial coils is not affected by anisotropy. However, FIG. 5 is more advantageous because of the greater relative change in atten and phase. Also, in FIG. 5, changes in $\sigma_v$ are more easily distinguished from changes in $\sigma_h$.

To understand the vertical response of these measurements, simulated logs were computed for the model formation with a step profile. The relative dip angle is zero. The values of $R_h$ (horizontal resistivity) and $R_v$ increase by steps, as shown in the left panel of FIG. 6. The values of $R_h$ are 10 (upper four sublayers), 20 (middle four sublayers), and 50 ohm-m (lower four sublayers). For each respective sublayer within each of those three four-sublayer blocks, the ratio $R_v/R_h$ has the values 1, 2, 5, and 10.

Figure 6:
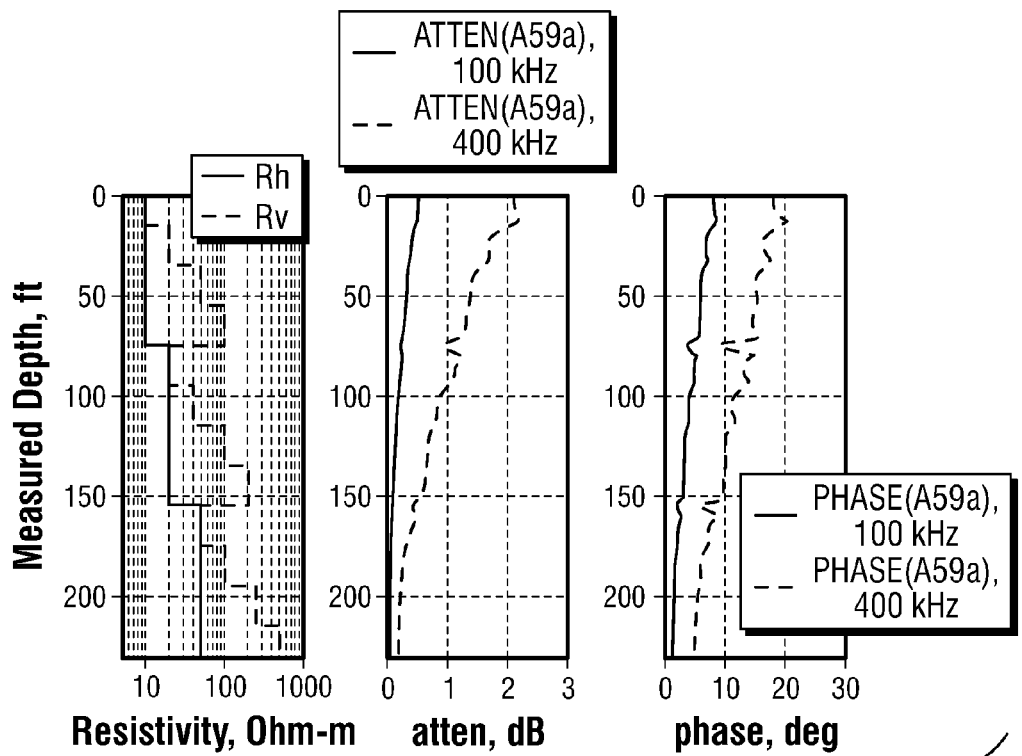
FIG. 6 is a set of plots showing the simulation results of the ratio $\mathcal{R}$ in a model formation for frequencies of 100 kHz and 400 kHz, in accordance with the present disclosure.
Figure 7:
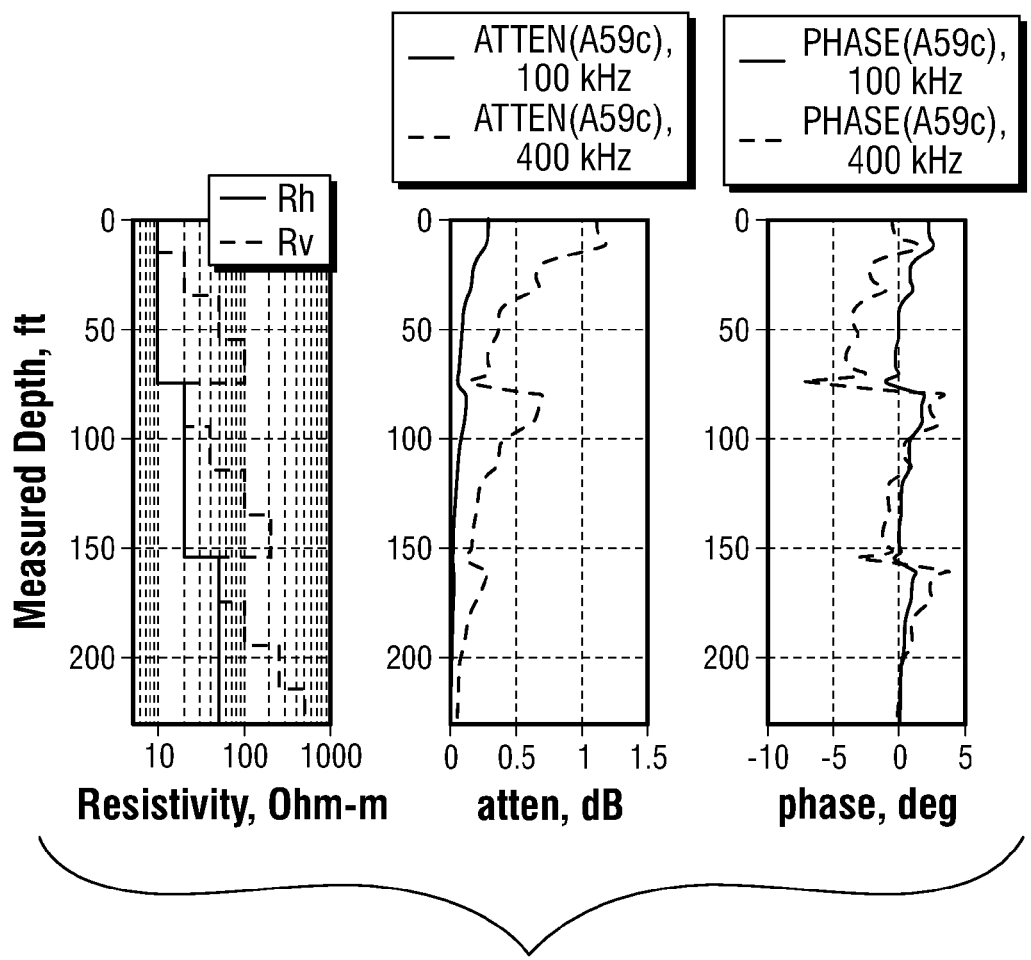
FIG. 7 is a set of plots showing the simulation results of the ratio $\mathcal{R}$ in a model formation for frequencies of 100 kHz and 400 kHz, in accordance with the present disclosure.

The simulated logs were computed with a semi-analytic code for a medium with transversely isotropic parallel plane layers with dip. The computed attenuation and phase shift logs are shown in FIGS. 6 and 7. They assume point dipole coils. The results for the $A_{59a}$ computation are plotted in the second and third panels of FIG. 6. The dashed-line curves in each of those plot panels (one for attenuation, one for phase shift) correspond to a 400 kHz signal. The solid-line curve in each of those plot panels corresponds to the ratio $\mathcal{R}$ computed for a frequency of 100 kHz.

The second and third plot panels of FIG. 7 display the computed logs for the $A_{59c}$ ratio. The dashed-line curves in the attenuation (second) plot panel and the phase shift (third) plot panel corresponds to the 400 kHz signal. The solid-line curves correspond to the 100 kHz signal in the attenuation plot panel and the phase shift plot panel.

Changes in $R_v$ produce a bigger relative change in the phase and attenuation for the ratio $\mathcal{R}$, as compared to those for $\mathcal{R}$ in FIG. 6. Also, the location of the bed boundaries is more easily inferred from these logs than from the logs of FIG. 6. After inversion, the ratio $\mathcal{R}$ yields a better estimate of the vertical resistivity $R_v$ than the $\mathcal{R}$ ratio.

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine the vertical resistivity of a subsurface formation, comprising:
   providing a downhole logging tool having a plurality of spaced antennas, at least one of which is a transverse antenna, at least two of which are tilted antennas, and at least two of which are axial antennas;
   obtaining measurements involving the transverse and/or the tilted antennas of the downhole logging tool;
   forming voltage ratios using the measurements;
   forming conditioning factors by raising the voltage ratios not involving the transverse antenna to some power, wherein the sum of the exponents of the conditioning factors equals one;
   computing a ratio using at a voltage ratio involving a transverse antenna and the conditioning factors; and determining the vertical resistivity of the subsurface formation using the computed ratio.

2. The method of claim 1, wherein at least some of the spaced antennas have relative symmetries.

3. The method of claim 1, wherein the tilt angles of at least two of the tilted antennas are equal.

4. The method of claim 1, wherein at least two of the tilted antennas are azimuthally rotated by 90 degrees relative to one another.

5. The method of claim 1, wherein two of the plurality of spaced antennas are axial transmitters, the tilted antennas are receivers, and there is relative symmetry between the axial transmitters and the tilted receivers; and further comprising forming conditioning factors using measurements from those axial transmitters and tilted receivers.

6. The method of claim 1, wherein the measurements involving the transverse and/or the tilted antennas include transverse/axial couplings, tilted/axial couplings, and transverse/tilted couplings.

7. The method of claim 1, wherein the ratio computed is that given by Equation 3.

8. The method of claim 1, further comprising determining and plotting the horizontal and vertical resistivities for each sublayer in a formation model.

9. The method of claim 1, further comprising plotting the attenuation versus measured depth of a wellbore and/or the phase shift versus the measured depth.

10. The method of claim 9, further comprising determining by inversion the horizontal resistivity and vertical resistivity of the formation.

11. The method of claim 1, further comprising computing the attenuation and/or the phase shift of a signal.

12. The method of claim 11, wherein the signal has a frequency of 100 kHz or 400 kHz.

13. A system to determine the vertical resistivity of a subsurface formation, comprising:
a downhole logging tool having a plurality of spaced antennas, at least one of which is a transverse antenna, at least two of which are tilted antennas, and at least two of which are axial antennas; and
a processor capable of:
forming voltage ratios using measurements involving the transverse and/or the tilted antennas of the downhole logging tool;
forming conditioning factors by raising the voltage ratios not involving the transverse antenna to some power, wherein the sum of the exponents of the conditioning factors equals one;
computing a ratio using a voltage ratio involving the transverse antenna and the conditioning factors; and
determining the vertical resistivity of the subsurface formation using the computed ratio.

14. The system of claim 13, wherein the downhole logging tool is disposed on a wireline, a drill string, or a wired drill pipe.

15. The system of claim 13, wherein at least some of the spaced antennas have relative symmetries.

16. The system of claim 13, wherein the tilt angles of at least two of the tilted antennas are equal.

17. The system of claim 13, wherein the measurements involving the transverse and/or the tilted antennas include transverse/axial couplings, tilted/axial couplings, and transverse/tilted couplings.

18. The system of claim 13, wherein two of the plurality of spaced antennas are axial transmitters, the tilted antennas are receivers, and there is relative symmetry between the axial transmitters and the tilted receivers; and further comprising forming conditioning factors using measurements from those axial transmitters and tilted receivers.

19. A system having a non-transitory computer-readable medium having a set of computer-readable instructions encoded thereon that, when executed, perform acts comprising:
obtaining measurements involving the transverse and/or the tilted antennas of a downhole logging tool;
forming voltage ratios using the measurements;
forming conditioning factors by raising the voltage ratios not involving the transverse antenna to some power, wherein the sum of the exponents of the conditioning factors equals one;
computing a ratio using a voltage ratio involving a transverse antenna and the conditioning factors; and
determining the vertical resistivity of the subsurface formation using the computed ratio.

20. The system of claim 19, wherein the downhole logging tool has a plurality of spaced antennas, at least one of which is a transverse antenna, at least two of which are tilted antennas, and at least two of which are axial antennas.

* * * * *